(12) United States Patent
Deshmukh et al.

(10) Patent No.: US 8,024,309 B1
(45) Date of Patent: *Sep. 20, 2011

(54) STORAGE RESOURCE MANAGEMENT ACROSS MULTIPLE PATHS

(75) Inventors: Vijay Deshmukh, Mountain View, CA (US); Benjamin Swartzlander, San Jose, CA (US); Timothy J. Thompson, San Jose, CA (US)

(73) Assignee: Netapp, Inc., Sunnyvale, CA (US)

( * ) Notice: Subject to any disclaimer, the term of this patent is extended or adjusted under 35 U.S.C. 154(b) by 1004 days.

This patent is subject to a terminal disclaimer.

(21) Appl. No.: 11/848,165

(22) Filed: Aug. 30, 2007

Related U.S. Application Data (63) Continuation of application No. 10/798,987, filed on Mar. 12, 2004, now Pat. No. 7,293,039.

(51) Int. Cl.
*G06F 17/00* (2006.01)
(52) U.S. Cl. .................................. 707/705; 709/224
(58) Field of Classification Search ................ 707/736, 707/737, 705; 709/224
See application file for complete search history.

(56) References Cited

U.S. PATENT DOCUMENTS

| | | | |
|---|---|---|---|
| 5,146,540 A * | 9/1992 | Natarajan | 706/10 |
| 5,313,631 A | 5/1994 | Kao | |
| 5,555,417 A | 9/1996 | Odnert et al. | |
| 5,566,328 A | 10/1996 | Eastep | |
| 5,970,494 A | 10/1999 | Velissaropoulos et al. | |
| 5,987,506 A | 11/1999 | Carter et al. | |
| 5,999,930 A | 12/1999 | Wolff | |
| 6,023,706 A | 2/2000 | Schmuck et al. | |
| 6,052,724 A | 4/2000 | Willie et al. | |
| 6,072,936 A | 6/2000 | Koyama | |
| 6,138,249 A | 10/2000 | Nolet | |
| 6,192,191 B1 | 2/2001 | Suga et al. | |
| 6,199,082 B1 | 3/2001 | Ferrel et al. | |
| 6,208,999 B1 * | 3/2001 | Spilo et al. | 1/1 |
| 6,292,797 B1 | 9/2001 | Tuzhilin et al. | |
| 6,298,349 B1 | 10/2001 | Toyoshima et al. | |
| 6,311,194 B1 | 10/2001 | Sheth et al. | |
| 6,356,902 B1 | 3/2002 | Tan et al. | |
| 6,389,427 B1 | 5/2002 | Faulkner | |

(Continued)

FOREIGN PATENT DOCUMENTS
WO    WO 02/25870    3/2002

OTHER PUBLICATIONS

David Marshall, "Threads: Basic Theory and Libraries", May 1999, pp. 2-32.

(Continued)

*Primary Examiner* — Angela Lie
(74) *Attorney, Agent, or Firm* — Perkins Coie LLP (57) ABSTRACT

According to an embodiment of the invention, a filer or other storage server is coupled to a network to store files for users of the network. Agents are coupled to the filer, and performs a scan or file walk for a Multi-Appliance Management Application (MMA) which is coupled to the filer and can monitor and manage the filer. A directory structure of the filer may be divided into two or more paths, each of which may be scanned by an independent agent. The results of the scan, or file walk, are saved to a database server. In this way, multiple agents may be used to scan a single storage server, and the amount of time required for the scan is reduced.

25 Claims, 8 Drawing Sheets

U.S. PATENT DOCUMENTS

| | | | |
|---|---|---|---|
| 6,430,611 | B1 | 8/2002 | Kita et al. |
| 6,457,017 | B2 * | 9/2002 | Watkins et al. ............... 707/696 |
| 6,480,901 | B1 | 11/2002 | Weber et al. |
| 6,519,612 | B1 | 2/2003 | Howard et al. |
| 6,553,377 | B1 | 4/2003 | Eschelbeck et al. |
| 6,563,521 | B1 | 5/2003 | Perttunen |
| 6,571,257 | B1 | 5/2003 | Duggan et al. |
| 6,578,048 | B1 | 6/2003 | Mauldin |
| 6,625,615 | B2 | 9/2003 | Shi et al. |
| 6,625,624 | B1 | 9/2003 | Chen et al. |
| 6,636,250 | B1 | 10/2003 | Gasser |
| 6,687,729 | B1 | 2/2004 | Sievert et al. |
| 6,725,261 | B1 | 4/2004 | Novaes et al. |
| 6,754,890 | B1 | 6/2004 | Berry |
| 6,801,903 | B2 | 10/2004 | Brown et al. |
| 6,857,012 | B2 | 2/2005 | Sim et al. |
| 6,915,409 | B1 | 7/2005 | Peterson |
| 6,922,708 | B1 | 7/2005 | Sedlar |
| 6,947,940 | B2 | 9/2005 | Anderson et al. |
| 6,961,909 | B2 | 11/2005 | Lord et al. |
| 6,973,577 | B1 * | 12/2005 | Kouznetsov ................... 726/25 |
| 7,007,024 | B2 | 2/2006 | Zelenka |
| 7,007,244 | B2 | 2/2006 | Pankovcin |
| 7,013,323 | B1 | 3/2006 | Thomas et al. |
| 7,024,427 | B2 | 4/2006 | Bobbitt et al. |
| 7,054,927 | B2 | 5/2006 | Ulrich et al. |
| 7,080,277 | B2 | 7/2006 | Anna et al. |
| 7,089,313 | B2 | 8/2006 | Lee |
| 7,096,315 | B2 | 8/2006 | Takeda et al. |
| 7,120,757 | B2 | 10/2006 | Tsuge |
| 7,139,811 | B2 | 11/2006 | Lev Ran et al. |
| 7,167,915 | B2 | 1/2007 | Bendich et al. |
| 7,203,731 | B1 | 4/2007 | Coates et al. |
| 7,275,063 | B2 | 9/2007 | Horn |
| 7,289,973 | B2 | 10/2007 | Kiessig et al. |
| 7,293,039 | B1 | 11/2007 | Deshmukh et al. |
| 7,433,942 | B2 | 10/2008 | Butt et al. |
| 7,539,702 | B2 | 5/2009 | Deshmukh et al. |
| 7,630,994 | B1 | 12/2009 | Deshmukh et al. |
| 7,844,646 | B1 | 11/2010 | Deshmukh et al. |
| 2002/0049782 | A1 | 4/2002 | Herzenberg et al. |
| 2002/0091710 | A1 | 7/2002 | Dunham et al. |
| 2002/0147805 | A1 | 10/2002 | Leshem et al. |
| 2002/0175938 | A1 | 11/2002 | Hackworth |
| 2003/0046369 | A1 * | 3/2003 | Sim et al. ...................... 709/220 |
| 2003/0115218 | A1 | 6/2003 | Bobbitt et al. |
| 2004/0030586 | A1 * | 2/2004 | Cucchiara et al. ................ 705/3 |
| 2004/0078461 | A1 * | 4/2004 | Bendich et al. ............... 709/224 |
| 2004/0098363 | A1 * | 5/2004 | Anglin et al. ..................... 707/1 |
| 2004/0098383 | A1 | 5/2004 | Tabellion et al. |
| 2004/0122936 | A1 | 6/2004 | Mizelle et al. |
| 2004/0133606 | A1 | 7/2004 | Miloushev et al. |
| 2004/0143608 | A1 | 7/2004 | Nakano et al. |
| 2004/0181605 | A1 | 9/2004 | Nakatani et al. |
| 2004/0196970 | A1 | 10/2004 | Cole |
| 2004/0205143 | A1 | 10/2004 | Uemura |
| 2005/0022153 | A1 | 1/2005 | Hwang |
| 2005/0050269 | A1 | 3/2005 | Horn |
| 2005/0086192 | A1 | 4/2005 | Kodama |
| 2005/0102289 | A1 | 5/2005 | Sonoda et al. |
| 2005/0108474 | A1 | 5/2005 | Zhang et al. |
| 2005/0108484 | A1 * | 5/2005 | Park ............................. 711/162 |
| 2005/0166094 | A1 * | 7/2005 | Blackwell et al. .............. 714/38 |
| 2006/0041656 | A1 | 2/2006 | Li et al. |
| 2008/0091739 | A1 | 4/2008 | Bone et al. |

OTHER PUBLICATIONS

Co-pending U.S. Appl. No. 10/798,990, filed Mar. 12, 2004.
Co-pending U.S. Appl. No. 10/799,861, filed Mar. 12, 2004.
Co-pending U.S. Appl. No. 10/800,163, filed Mar. 12, 2004.
Co-pending U.S. Appl. No. 10/798,987, filed Mar. 12, 2004.
Co-pending U.S. Appl. No. 12/074,178, filed Feb. 29, 2008.
Notice of Allowance Mailed Jan. 15, 2010 in Co-Pending U.S. Appl. No. 10/800,163, filed Mar. 12, 2004.
Non-Final Office Action Mailed Jul. 8, 2009 in Co-Pending U.S. Appl. No. 10/800,163, filed Mar. 12, 2004.
Final Office Action Mailed Sep. 24, 2008 in Co-Pending U.S. Appl. No. 10/800,163, filed Mar. 12, 2004.
Non-Final Office Action Mailed Feb. 20, 2008 in Co-Pending U.S. Appl. No. 10/800,163, filed Mar. 12, 2004.
Final Office Action Mailed Jul. 30, 2007 in Co-Pending U.S. Appl. No. 10/800,163, filed Mar. 12, 2004.
Non-Final Office Action Mailed Sep. 28, 2006 in Co-Pending U.S. Appl. No. 10/800,163, filed Mar. 12, 2004.
Non-Final Office Action mailed Nov. 25, 2009 in Co-pending U.S. Appl. No. 12/074,178, filed Feb. 29, 2008.
Notice of Allowance Mailed Feb. 9, 2009 in Co-pending U.S. Appl. No. 10/798,990, filed Mar. 12, 2004.
Non-Final Office Action Mailed Aug. 18, 2008 in Co-pending U.S. Appl. No. 10/798,990, filed Mar. 12, 2004.
Final Office Action Mailed May 1, 2008 in Co-pending U.S. Appl. No. 10/798,990, filed Mar. 12, 2004.
Non-Final Office Action Mailed Aug. 19, 2007 in Co-pending U.S. Appl. No. 10/798,990, filed Mar. 12, 2004.
Final Office Action Mailed Apr. 4, 2007 in Co-pending U.S. Appl. No. 10/798,990, filed Mar. 12, 2004.
Non-Final Office Action Mailed Oct. 2, 2006 in Co-pending U.S. Appl. No. 10/798,990, filed Mar. 12, 2004.
Notice of Allowance Mailed Jul. 29, 2009 in Co-pending U.S. Appl. No. 10/799,861, filed Mar. 12, 2004.
Non-Final Office Action Mailed Feb. 6, 2009 in Co-pending U.S. Appl. No. 10/799,861, filed Mar. 12, 2004.
Final Office Action Mailed Oct. 16, 2008 in Co-pending U.S. Appl. No. 10/799,861, filed Mar. 12, 2004.
Non-Final Office Action Mailed Apr. 21, 2008 in Co-pending U.S. Appl. No. 10/799,861, filed Mar. 12, 2004.
Non-Final Office Action Mailed Sep. 17, 2007 in Co-pending U.S. Appl. No. 10/799,861, filed Mar. 12, 2004.
Final Office Action Mailed Apr. 4, 2007 in Co-pending U.S. Appl. No. 10/799,861, filed Mar. 12, 2004.
Non-Final Office Action Mailed Sep. 20, 2006 in Co-pending U.S. Appl. No. 10/799,861, filed Mar. 12, 2004.
Notice of Allowance Mailed Jul. 6, 2007 in Co-pending U.S. Appl. No. 10/798,987, filed Mar. 12, 2004.
Final Office Action Mailed Mar. 19, 2007 in Co-pending U.S. Appl. No. 10/798,987, filed Mar. 12, 2004.
Non-Final Office Action Mailed Sep. 27, 2006 in Co-pending U.S. Appl. No. 10/798,987, filed Mar. 12 2004.
Notice of Allowance Mailed May 5, 2010 in Co-Pending U.S. Appl. No. 10/800,163, filed Mar. 12, 2004.
Final Office Action Mailed Jun. 10, 2010 in Co-pending U.S. Appl. No. 12/074,178, filed Feb. 29, 2008.
Notice of Allowance Mailed Sep. 1, 2010 in Co-Pending U.S Appl. No. 10/800,163, filed Mar. 12, 2004.
Non-Final Office Action mailed Oct. 2, 2010 in Co-pending U.S. Appl. No. 12/074,178, filed Feb. 29, 2008.
Non-Final Office Action Mailed Apr. 15, 2011 in Co-pending U.S. Appl. No. 12/074,178, filed Feb. 29, 2008.

* cited by examiner

| | Name | Time Last Accessed |
|---|---|---|
| 702 — Least Recently Accessed | /u/employees/a-m/banner.jpg | 02/04/1999 2:48 am |
| 704 — Largest | Name | Size |
| | /u/employees/bigmovie.mpg | 2.7 GB |
| 706 — Smallest | Name | Size |
| | /u/employees/a-m/jones/small.txt | 27 bytes |
| 708 — Oldest | Name | Date |
| | /u/employees/command.com | 01/01/1980 12:01 am |

FIG. 7A

| | Name | Time Last Accessed |
|---|---|---|
| 722 — Least Recently Accessed | /u/administrators/sysadmin/log.txt | 01/08/1998 12:13 am |
| 724 — Largest | Name | Size |
| | /u/administrators/db.dat | 183.6 MB |
| 726 — Smallest | Name | Size |
| | /u/administrators/small.bat | 12 bytes |
| 728 — Oldest | Name | Date |
| | /u/administrators/old file.txt | 9/12/1987 3:16 am |

FIG. 7B

| | Name | Time Last Accessed |
|---|---|---|
| 742 — Least Recently Accessed | /u/administrators/sysadmin/log.txt | 01/08/1998 12:13 am |
| 744 — Largest | Name | Size |
| | /u/employees/bigmovie.mpg | 2.7 GB |
| 746 — Smallest | Name | Size |
| | /u/administrators/small.bat | 12 bytes |
| 748 — Oldest | Name | Date |
| | /u/employees/command.com | 01/01/1980 12:01 am |

FIG. 7C

STORAGE RESOURCE MANAGEMENT ACROSS MULTIPLE PATHS

This is a continuation of U.S. patent application Ser. No. 10/798,987 filed on Mar. 12, 2004.

FIELD OF THE INVENTION

At least one embodiment of the present invention pertains to networked storage systems, and more particularly to a method and apparatus for collecting and reporting data pertaining to files stored on a storage server.

BACKGROUND

A file server is a type of storage server which operates on behalf of one or more clients to store and manage shared files in a set of mass storage devices, such as magnetic or optical storage based disks. The mass storage devices are typically organized as one or more groups of Redundant Array of Independent (or Inexpensive) Disks (RAID). One configuration in which file servers can be used is a network attached storage (NAS) configuration. In a NAS configuration, a file server can be implemented in the form of an appliance, called a filer, that attaches to a network, such as a local area network (LAN) or a corporate intranet. An example of such an appliance is any of the NetApp Filer products made by Network Appliance, Inc. in Sunnyvale, Calif.

A filer may be connected to a network, and may serve as a storage device for several users, or clients, of the network. For example, the filer may store user directories and files for a corporate or other network, such as a LAN or a wide area network (WAN). Users of the network can be assigned an individual directory in which they can store personal files. A user's directory can then be accessed from computers connected to the network.

A system administrator can maintain the filer, ensuring that the filer continues to have adequate free space, that certain users are not monopolizing storage on the filer, etc. A Multi-Appliance Management Application (MMA) can be used to monitor the storage on the filer. An example of such an MMA is the Data Fabric Monitor (DFM) products made by Network Appliance, Inc. in Sunnyvale, Calif. The MMA may provide a Graphical User Interface (GUI) that allows the administrator to more easily observe the condition of the filer.

The MMA needs to collect information about files stored on the filer to report back to the administrator. This typically involves a scan or "file walk" of storage on the filer. During the file walk, the MMA can determine characteristics of files stored on the filer, as well as a basic structure, or directory tree, of the directories stored thereon. These results can be accumulated, sorted, and stored in a database, where the administrator can later access them. The MMA may also summarize the results of the file walk so they are more easily readable and understood by the administrator.

A filer may manage a volume storing several million files. The amount of time and system resources needed to scan such a large volume can make it prohibitive for the MMA to perform the file walk. However, the system administrator still needs the file walk information to effectively manage the filer. What is needed is a way to more effectively monitor a filer that manages a large number of files.

SUMMARY OF THE INVENTION

Other aspects of the invention will be apparent from the accompanying figures and from the detailed description which follows.

A method for performing a file walk of a storage server is disclosed. A first path and a second path on a storage server are determined. A first information about the first path is collected using a first agent, and a second information about the second path is collected using a second agent. The first and second information are stored in a common format.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Described herein are methods and apparatuses for storage resource management across multiple paths. Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment; however, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

According to an embodiment of the invention, one or more filers is managed by a multi appliance management application (MMA). The MMA controls one or more agents which perform a file walk of the filers. The MMA may divide the directory structure of a filer into multiple paths, so that more than one agent can perform file walk of a single filer. A filer may also be scanned by one or more agents having different file systems. For example, a single filer may scanned by the first agent using a first file system, such as the Common Internet File System (CIFS), and a second agent using a separate file system, such as the Network File System (NFS). A directory structure may be represented using a logical tree. The MMA can divide the tree into one or more sub trees. Each of these sub trees can be scanned by a different agent. Each of these sub trees may represent a path. The MMA can divide the directories on a filer into several different paths, so that several different agents may scan a single filer in order to reduce the amount of time required to complete a file walk. As a result, multiple paths are used to improve storage resource management.

The MMA is generally a single server that is used to allow a system administrator to monitor a storage or file server. When a high capacity storage server is monitored, the MMA may have difficulty performing its monitoring duties and a file walk at the same time. In fact, the file walk may make the MMA inaccessible to the system administrator, and the MMA may further become a bottleneck to the file walk process, since it may be incapable of performing the file walk in a reasonable amount of time. According to an embodiment of the invention, independent agents are used to perform the file walk, to reduce the load on the MMA. At a later time, the system administrator may want summarized information about the file server. Instead of having the MMA summarize the information, the summaries are compiled by the agent during the file walk, and stored on a database server.

Figure 1:
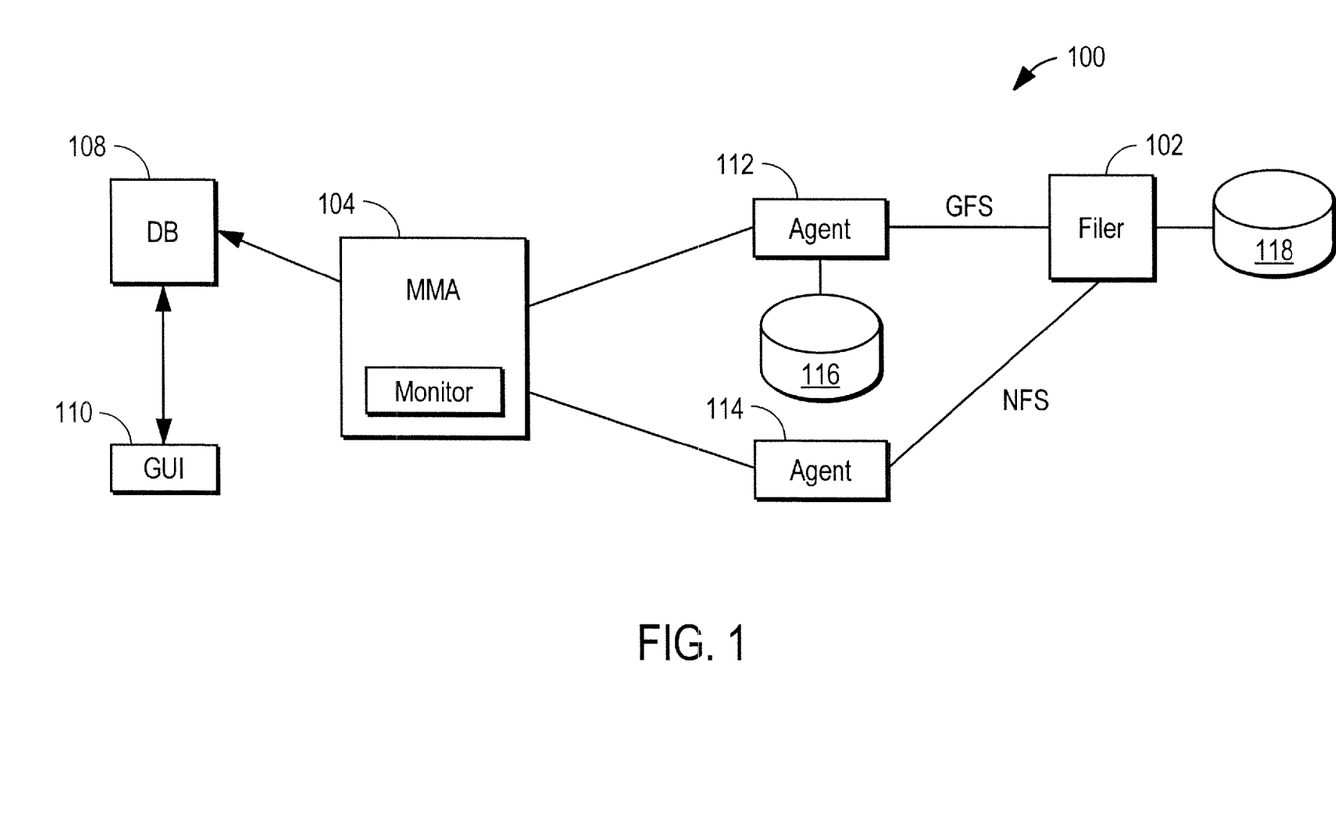
FIG. 1 illustrates a monitoring system for a storage server.

FIG. 1 illustrates a monitoring system for a storage server. The system 100 includes a filer 102, an MMA 104 including a monitor 106, a database 108, a graphical user interface (GUI) 110, and two agents 112 and 114. The agents 112 and 114 can perform a file walk of the filer 102 for the MMA 104. An agent may be an independent server that is attached to the network and is dedicated to performing file walks. By having an agent perform this task rather than having the MMA do it, the MMA can save its resources for other tasks, such as monitoring current activity on the filer 102 using the monitor 106. Ultimately, one goal is to minimize the amount of work the MMA is required to do. Additionally, multiple agents can be added to perform a complete file walk in less time.

According to one embodiment of the invention, the agents 112 and 114 may use a file system different from the one used by the filer 102. For example, the agent 112 uses the Common Internet File System (CIFS), while the agent 114 uses the Network File System (NFS). Here, either agent 112 or 114 is able to perform the file walk of the filer 102, regardless of the file system used by the filer 102. The agent 112 also has storage 116 to store the results of a file walk while the walk is occurring and before they are transferred to the MMA 104. The agent 114 may also have attached storage for this purpose.

The filer 102 is generally attached to a volume 118. The volume 118 may include one or more physical hard drives or removable storage drives that comprise the storage for the filer 102. For example, the volume 118 may comprise a RAID structure. The filer 102 may also be connected to other volumes that comprise storage. A file walk generally scans all files stored on the entire volume 118, regardless of whether all of the files are stored on the same physical drive. Further, although the volume 118 may contain several separate physical drives, the volume 118 may appear and function as a single entity.

The results of a file walk may be transferred to and stored on the database server 108 after the file walk is complete. The database server 108 can then be accessed by the GUI 110, so that an administrator can search the results of the file walk. The GUI 110 may allow the administrator to easily parse the results of a specific file walk, including allowing the administrator to monitor the total size of files stored on the filer, the size of particular directories and their subdirectories, the parents of specific directories, etc. These queries will be discussed in more detail below. The file walk may also collect statistics about the files on the filer, such as the total size of files, the most accessed files, the types of files being stored, etc. According to one embodiment, the GUI 110 may be a web-based Java application.

According to an embodiment of the invention, the summary is written to the database server 108 as a table or a histogram. The summary may then be accessed through a Java applet using a web browser such as Internet Explorer or Netscape. In another embodiment, the summaries are accessed using other programs. Although tables and histograms are shown here, it is understood that any appropriate manner of presenting the summary data to the administrator may be used.

Figure 2:
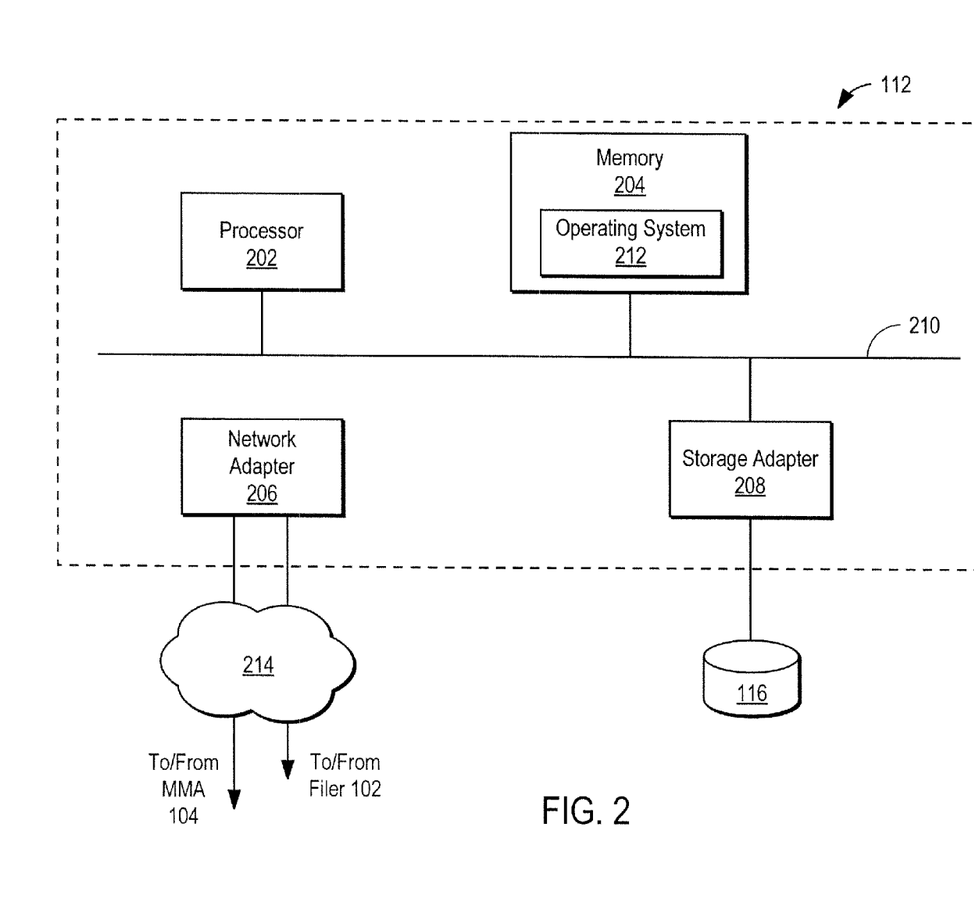
FIG. 2 illustrates a block diagram of an agent.

FIG. 2 illustrates a block diagram of an agent. The agent 112 includes a processor 202, a memory 204, a network adapter 206, and a storage adapter 208. These components are linked through a bus 210. The agent 112, as shown in FIG. 2, is typical of a network server or appliance, and it is understood that various different configurations may be used in its place. The agent 114 may be similar.

The processor 202 may be any appropriate microprocessor or central processing unit (CPU), such as those manufactured by Intel or Motorola. The memory 204 may include a main random access memory (RAM), as well as other memories including read only memories (ROM), flash memories, etc. The operating system 212 is stored in the memory 212 while the agent 112 is operating. The operating system includes the file system, and may be any operating system, such as a Unix or Windows based system. The network adapter 206 allows the agent 112 to communicate with remote computers over the network 214. Here, the agent 112 will be collecting data from the filer 102 and sending data to the MMA 104. The storage adapter 208 allows the agent 112 to communicate with the storage 116 and other external storage.

Several agents 112 and 114 may be added in order to reduce the amount of time required to file walk a filer 102. The administrator, using the GUI 110 can configure the number of agents 112 and 114 assigned to a file walk. For example, in one embodiment, a single agent 112 or 114 may be able to scan five million files per hour. If the filer 102 has five million files, a single agent 112 or 114 can complete a full file walk of a filer 102 in one hour. However, the administrator may need the file walk information less time. If both agents 112 and 114 are assigned to walk the filer 102, the results of the file walk could be reported within approximately thirty minutes.

In a further embodiment, the GUI 110 may include an option such that an administrator can specify the amount of time in which the walk should be completed. For example, an administrator may specify that a file walk should be completed in one hour. The MMA 102 can then determine the number of agents 112 or 114 required to perform the file walk within approximately that time period based on the speed of the agent(s) and the number of files on the filer 102.

Figure 3A:
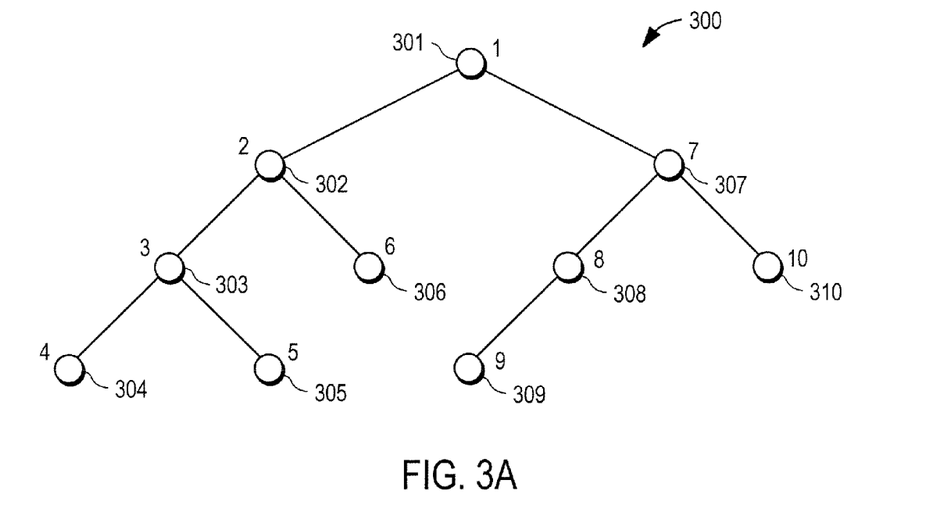
FIG. 3A illustrates a directory structure represented by a tree.
Figure 3B:
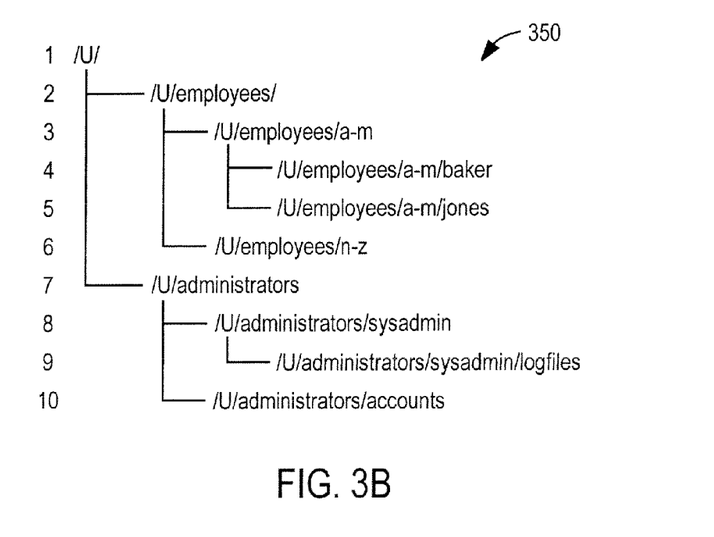
FIG. 3B illustrates the names of the directories shown in the tree 300.

FIG. 3A illustrates a directory structure represented by a tree. The tree 300 includes several nodes 301 through 310. Each node 301 through 310 may represent an individual directory stored on a filer 102. The tree 300 provides a convenient visual representation of directories stored on the filer 102. FIG. 3B illustrates the directory names of the nodes 301-110 shown in the tree 300. As can be seen, each directory that is stored within another directory is located beneath that directory in the tree. For example, the node 301 represents the directory /u/. The node 302 represents the directory /u/employees/. The node 301 is considered the parent of its child node 302. In fact, in the tree 300, the node 301 is the parent of all the other nodes 302 through 310. The node 301 may also be referenced to as the "root node." Nodes that are on the same level of the tree 300, such as the nodes 302 and 307, are known as "siblings" since they both have the same immediate parent.

The nodes 301-310 are also assigned identification (ID) numbers. The ID numbers are assigned to the nodes 301 through 310 in order starting with the number 1. The ID numbers can be used to easily identify specific directories. The ID numbers as shown in the tree 300 are in a Depth First Search (DFS) order. However, it is understood that other numbering conventions may also be used. The DFS order assigns an ID number to a node by traversing the tree to the bottom first and then across the tree. In this way, all the children of a specific node are assigned ID numbers before a sibling of that node is assigned its ID number. If a node has no more siblings, the process moves back up the tree. The ID numbers are assigned during a file walk, in consecutive order. So, the file walk is also conducted in a DFS order. The DFS order facilitates efficient queries about specific directories and their relationships with other directories.

Figure 3C:
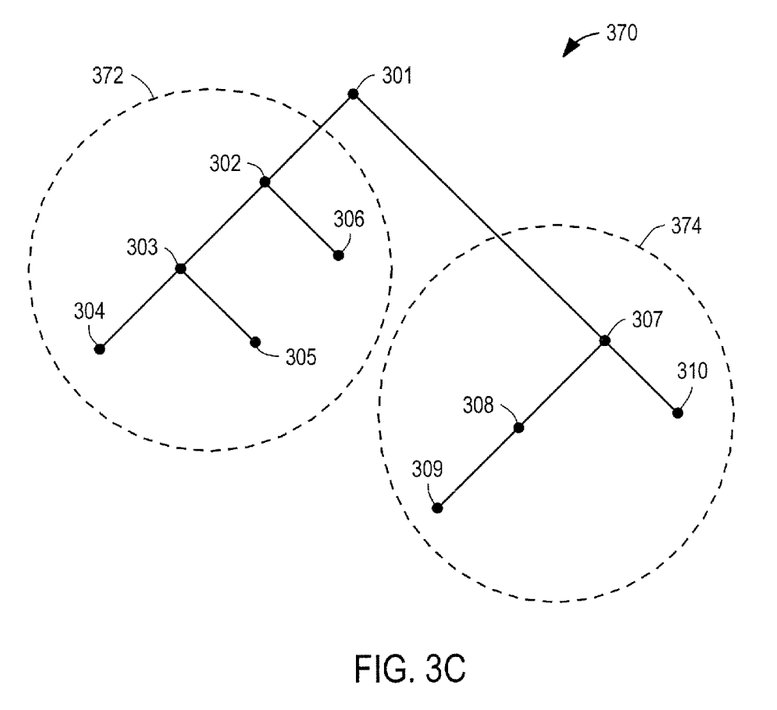
FIG. 3C illustrates a tree divided into two paths.

A path is a portion of a directory structure on a storage device. For example, a path may be a directory and all of its subdirectories, and here will be a sub tree. FIG. 3C illustrates a tree divided into two paths. The tree 370 shows the same directory structure represented in the tree 300, however the tree 370 has been divided into two paths 372 and 374. Each path 372 and 374 is a sub tree of the larger tree 370. An administrator can determine the paths 372 and 374 based on the approximate number of files located within a specific subdirectory. For example, the new root node 302 of the path 372 is the directory /u/employees/. The new root node of the path 374 is the directory /u/administrators/. An administrator may determine that these two sub trees have a roughly equal number of files located within them. Therefore, each path 372 and 374 can be independently scanned by a separate agent 112 or 114. This way, the administrator can reduce the amount of time required to walk the entire tree by having multiple agents 112 and 114 perform the file walk. An agent 112 or 114 treats each path 372 and 374 as if it were an independent filer during the file walk.

Since the ID numbers of the nodes 301 through 310 are assigned during a file walk, a nodes in the path 372 may have an ID number that is the same as the ID number of a node the from the path 374. Each path or sub tree 372 and 374 will have an independent set of ID numbers. For example, the nodes 302 and 307 may both be assigned same ID number 1, since they are both the root nodes for the paths 372 and 374, respectively. Since the ID numbers can be used to perform queries across the tree 370, the administrator may choose a numbering convention that identifies the nodes individually. For example, the administrator may assign all the nodes in the left path 372 ID numbers beginning with a leading 'L', and may assign all the ID number in the right path 374 with a leading 'R'. This way, the ID numbers can be assigned without confusion as to which node or directory they refer.

Figure 4:
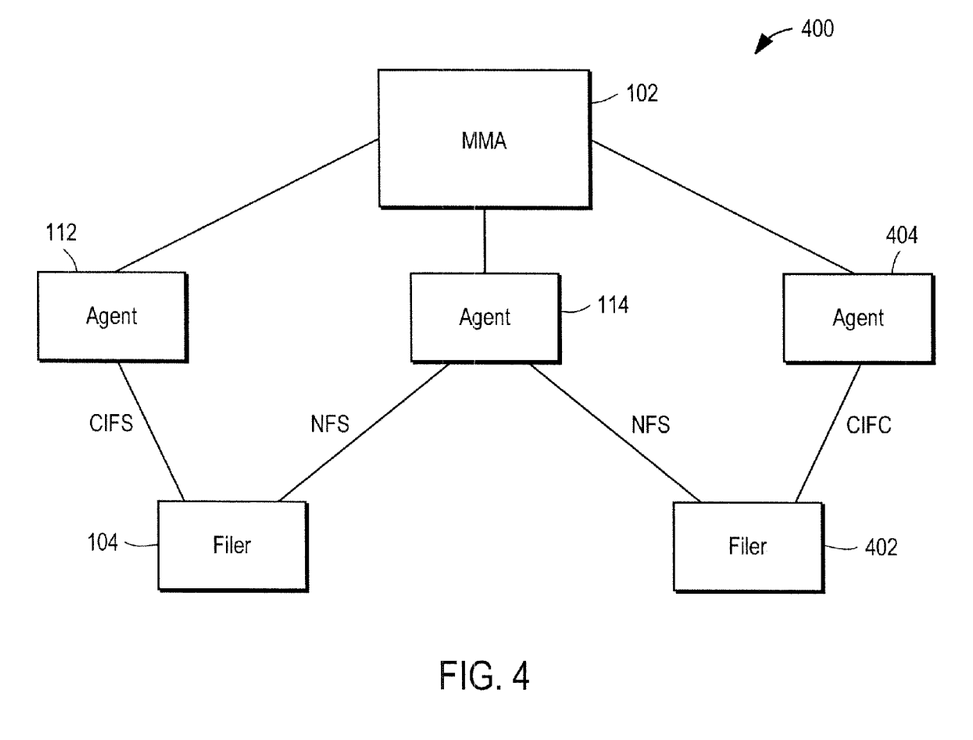
FIG. 4 illustrates a system for a file walk using several agents and several filers.

FIG. 4 illustrates a system for a file walk using several agents and several filers. The MMA 102 controls several agents 112, 114, and 404. The agents 112 and 404 use the CIFS file system, and the agent 114 uses the NFS file system. The filers 104 and 402 are by all system independent appliances. In other words, the agents 112, 114 and 404 may scan the filers 104 and 402 independent what file system they are using. Further, the information and summaries are stored in a neutral format that can easily be read by either file system. The format includes simple information about the files that is represented in the tables shown below. The results of a file walk may be reported in a table or histogram format which is independent of the file system with the agent. This is because of the type of data that is reported back by the agents 112, 114 and 402. The data reported back by the agents typically includes size of files, name of files, location of files, etc. The size of the files may be represented by an integer or other number that is easily stored in a table and that may be easily portable between file systems. Therefore, since the data being reported back by the agents 112, 114 and 404 is independent of the type of file system being used on the filers 402 and 102, the agents 112, 114 and 404 are able to walk any filer.

Figure 5:
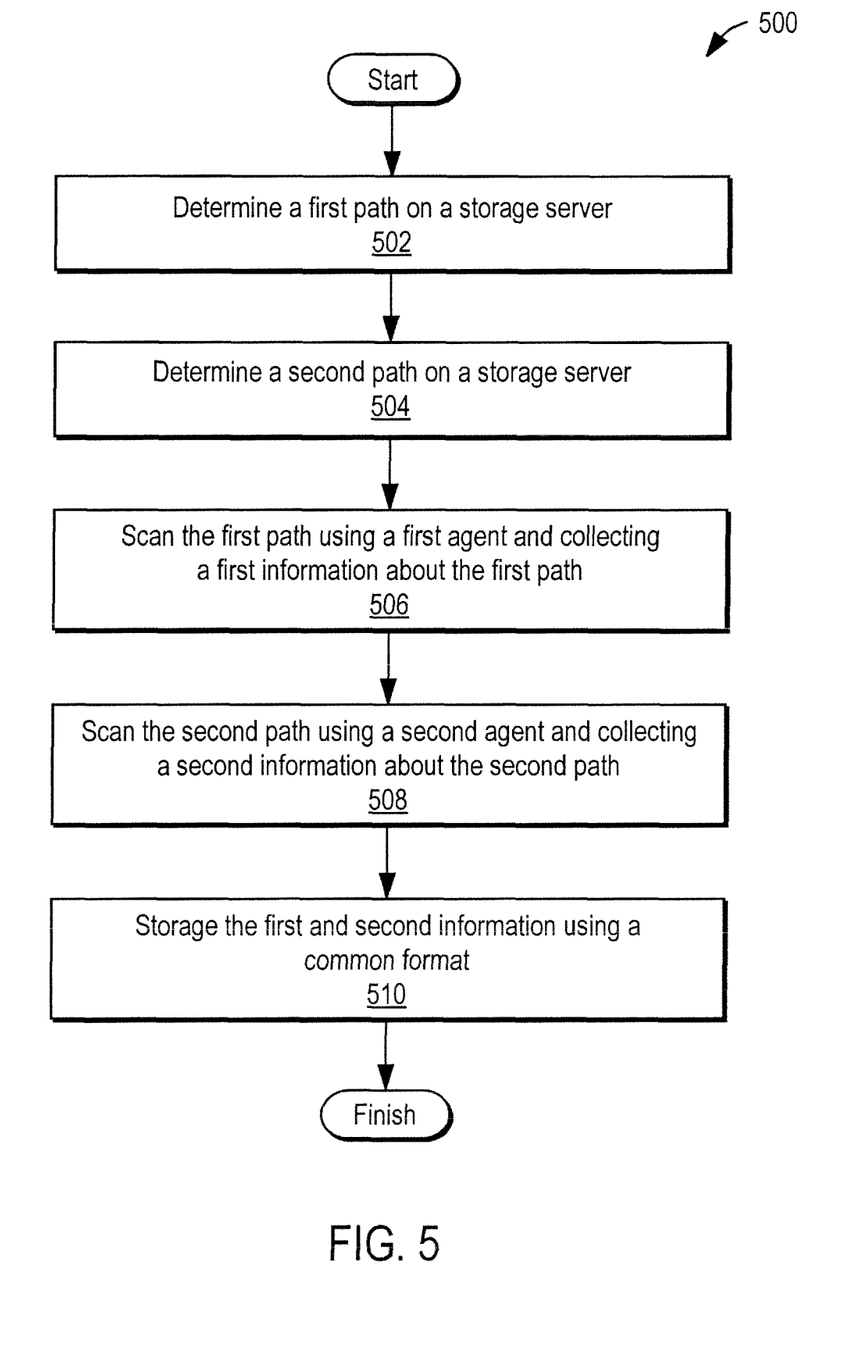
FIG. 5 is a flow chart illustrating a process for performing a file walk across multiple paths.

FIG. 5 is a flow chart illustrating a process for performing a file walk across multiple paths. The process 500 explains how a file system may be divided into several paths and how data may be collected regarding those files. In block 502, a first path on the storage server is determined. The first path may be determined by an administrator or an MMA 104. The first path may be the path 372 illustrated in FIG. 3C. The first path may be chosen so that it includes roughly the same number of files as the second path. The number of files located within the first path is more relevant to the amount of time required for walking those files, since each files must be scanned independently, and data retrieved from that analysis will typically be independent of file size.

In block 504, a second path on the storage server is determined. The second path may comprise the remainder of the file system. The second path may also contain roughly equal the number of files that the first path has. In another embodiment, the MMA 104 or an administrator may determine a third or further path for the file walk. This determination may be made depending on the number of agents available for the file walk, the size of the storage server and the number of files stored on the storage server, and the amount of time in which the administrator wishes to complete file walk.

In block 506, the first path is scanned using a first agent, thereby collecting a first information about the first path. The scan will reveal details about files stored in the first path, such as the file names, size of the files, location of files, the location of directories relative to each other, etc. The first agent will be dedicated to the first path, and will ignore the second path. The information collected may be stored in a table or histogram, which can later can be reviewed by an administrator or an MMA to make decisions about the operation of the filer 102. In block 508, the second path is scanned using a second agent, thereby collecting a second information about the second path. This process is described in block 506, and the information collected by the second agent is similar in scope to the information collected by the first agent. The second agent, likewise, scans the second path while disregarding the first path. In this way, a filer 102 may be scanned in an expedited manner.

In block 510, the first and second information are stored using a common format. By storing the information from both paths in common format, the MMA 104 and administrator may easily parse that information at a later time. The information may also be linked together, so that an administrator and the MMA 104 may gain an insight as to the overall state of the file 102. The two agents may be scanning the two paths for the same basic information, which may be reported as two tables or two histograms. Since the formats will be the same, the tables may either be merged at a later time, or linked together so that total system information may be determined. For example, if a administrator wanted to determine what the large file is stored in the two different paths was, the administrator can instruct the MMA 104 to examine the two different tables compiled by the two different agent. The MMA 104 could compare the large file found on the first path with the large file found on the second path, and easily determine the large file on the entire filer 102.

Figure 6A:
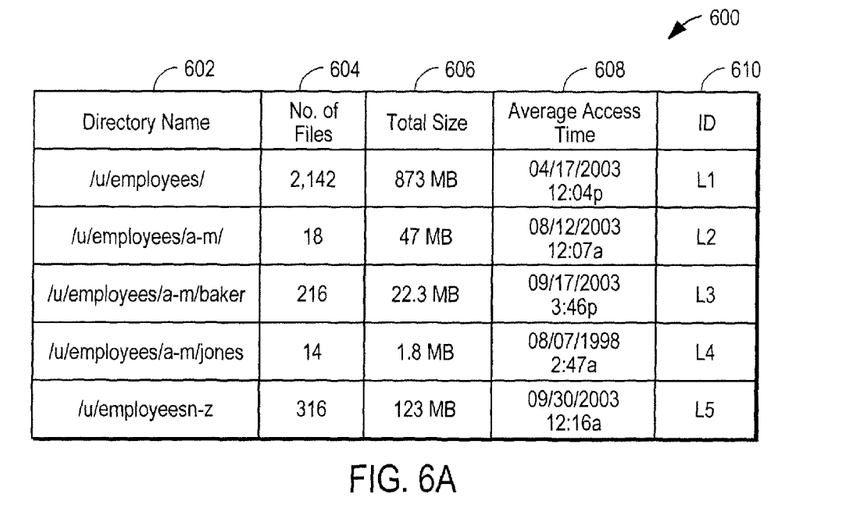
FIG. 6A illustrates a table showing information across a first path.
Figure 6B:
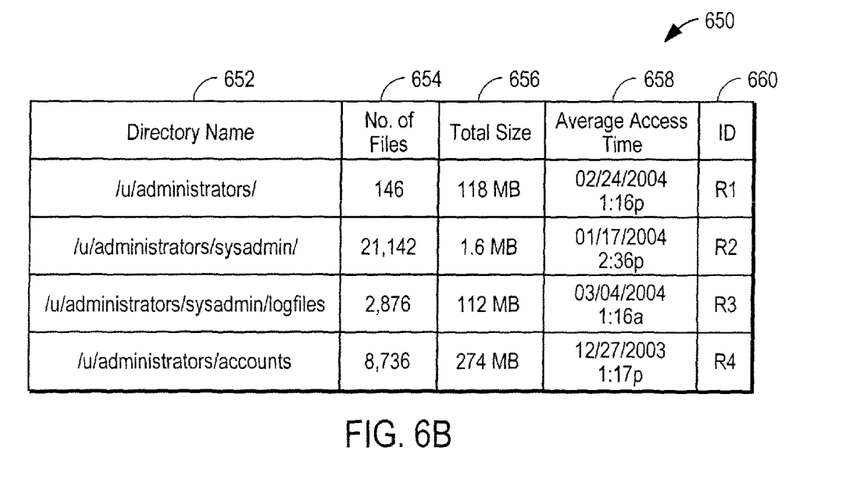
FIG. 6B illustrates a table showing information across a second path.

FIGS. 6A and 6B illustrate tables of collected information. FIG. 6A illustrates a table showing information across a first path. The table 600 includes information collected while scanning the first path 372. The table has several columns, including a column 602 listing the directory name, a column 604 listing the number of files in the directory, a column 606 listing a total size of files in the directory, a column 608 listing an average time of the last access to files in the directory, and a column 610 listing the ID number of the directory. FIG. 6B illustrates a table showing information across a second path. The information contained in the table 600 is generated during the file walk. Likewise, the information contained in the table 650 is generated during the file walk of the second path 374. The table 650 also includes several columns 652-660, which are similar to the columns of the table 600. As mentioned above, the ID numbers found in the columns 610 and 660 include a leading 'L' or 'R' to signify which path the directory belongs to.

Figure 7A:
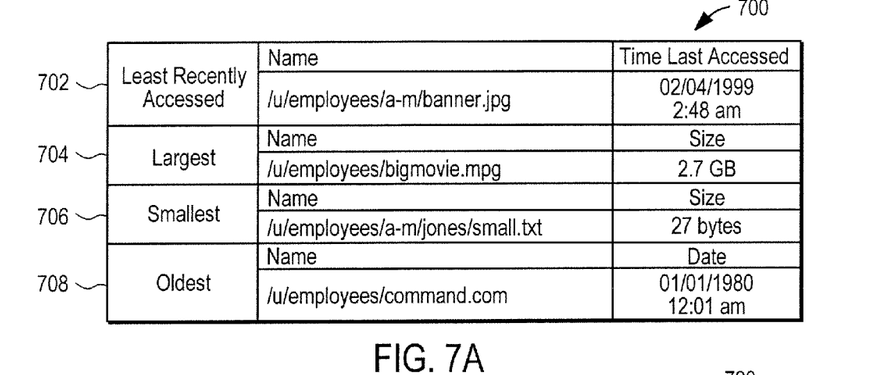
FIG. 7A illustrates a table showing cumulative information for a first path.
Figure 7B:
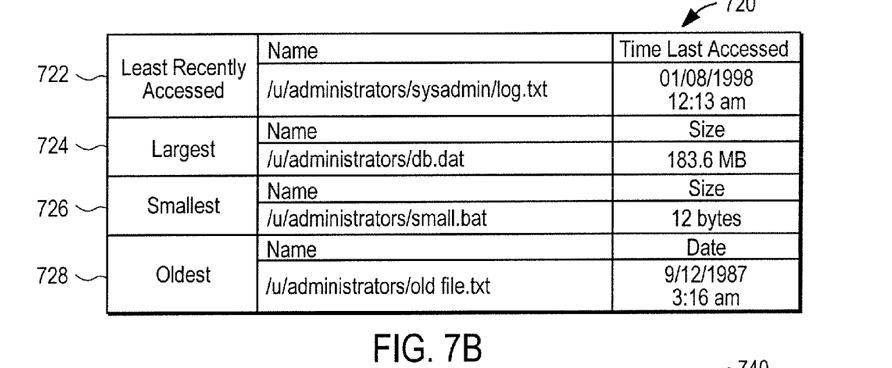
FIG. 7B illustrates a table showing cumulative information for a second path.
Figure 7C:
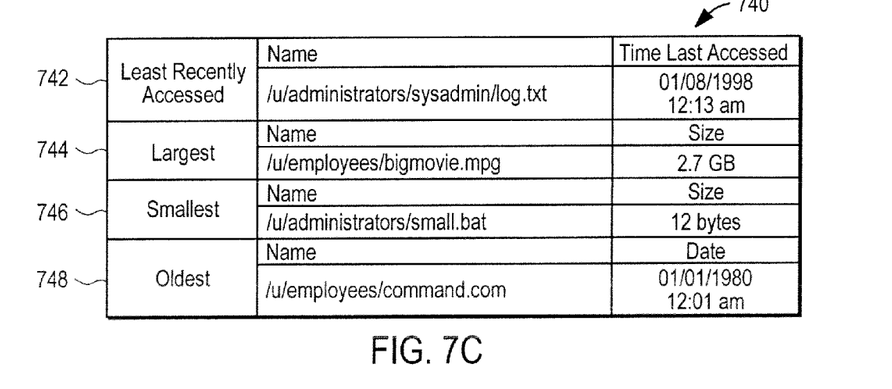
FIG. 7C illustrates a table showing cumulative information for both a first and a second path.

The tables 600 and 650 include information that is specific to the directories listed therein. The tables 650 can easily be appended to the table 600 to create a single table for the filer 102, since each directory has its own information. However, the file walk may also generate universal tables, listing such data as the largest file found, the oldest file found, etc. FIGS. 7A-C illustrate tables including cumulative information about files on a filer 102. FIG. 7A illustrates a table showing cumulative information for a first path. FIG. 7B illustrates a table showing cumulative information for a second path. FIG. 7C illustrates a table showing cumulative information for both a first and a second path. The table 700 includes interesting files found in the first path 372, and the table 720 includes interesting files found in the second path 374. The rows 702, 704, 706, and 708 list, respectively, the least recently accessed, largest, smallest, and oldest files found in the first path 372. Likewise, the rows 722-728 list the corresponding files found in the second path 374. The table 740 shows the interesting files for the entire filer 102. The rows 742-748 are analogous to the rows 702-708. For example, since the largest file is found in the first path 372, that is the largest file listed in the table 740. On the other hand, the smallest file is found in the second path 374, and that is the file listed in the table 740. It is understood that the tables 700, 720, and 740 may also present a list of the 'n' largest, smallest, oldest, and least recently accessed files. It is also understood that other categories may be used in accordance with the administrator's wishes.

The table 740 is a combined list of interesting files covering both paths 372 and 374. According to an embodiment of the invention, the MMA 104 may present the table 740 to the administrator, since the administrator may only want to know the interesting files for the entire filer 102, rather than the interesting files for each individual path 372 or 374. The agents 112 and 114 can still save the tables 700 and 720 to the database server 108 after the file walk, and a combined table 740 can be created either later or at the same time. The combined table 740 can either be created on the fly, when the administrator requests it, or can be created following the file walk of the two paths 372 and 374. Since the combined table 740 typically includes relatively few listed files, a relatively small amount of resources is required to form the combined table 740.

It is understood that other forms of representing the data collected during the file walk may be used. For example, a histogram may represent the usage of several different users. Likewise, a histogram or table may be created that shows the percentage of storage space on a filer 102 occupied by certain types of files. The MMA 104 may be configured so that useful data of any kind can be collected by the agents 112 and 114 and relayed to the administrator. The GUI 110 may also include an interface to allow the administrator to create customized tables or histograms.

The techniques introduced above have been described in the context of a NAS environment. However, these techniques can also be applied in various other contexts. For example, the techniques introduced above can be applied in a storage area network (SAN) environment. A SAN is a highly efficient network of interconnected, shared storage devices. One difference between NAS and SAN is that in a SAN, the storage server (which may be an appliance) provides a remote host with block-level access to stored data, whereas in a NAS configuration, the storage server provides clients with file-level access to stored data. Thus, the techniques introduced above are not limited to use in a file server or in a NAS environment.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are accordingly to be regarded in an illustrative, rather than in a restrictive sense.

What is claimed is:

1. A method comprising:
   using a storage system management application to manage information relating to operation of a storage system that includes a storage server;
   using a first agent which is physically separate from the storage system management application to scan a first subset of a structure of data stored in the storage system, to collect information about the first subset;
   using a second agent which is physically separate from the storage system management application to scan a second subset of a structure of the data stored in the storage system, to collect information about the second subset; and
   using the storage system management application to access the information collected about the first subset and the information collected about the second subset and to generate a human-readable report based thereon,
   wherein the first agent and the second agent are each configurable to scan a specified configurable portion of the structure of data at a particular level of granularity, and wherein the first subset of the structure of data and the second subset of the structure of data are determined based on an expected time for the first agent and the second agent to complete the scans.

2. A method as recited in claim 1, wherein the structure of data is a hierarchical structure of data.

3. A method as recited in claim 2, wherein the structure of data is a directory structure of a data volume.

4. A method as recited in claim 3, wherein the first agent uses a first file system and the second agent uses a second file system which is different from the first file system.

5. A method as recited in claim 3, wherein the first agent uses a first file system; the second agent uses a second file system; and the storage server uses a third file system to maintain the directory structure; and wherein the third file system is different from at least one of the first and second file systems.

6. A method as recited in claim 5, wherein the first file system is network file system (NFS) and the second file system is common Internet file system (CIFS).

7. A method as recited in claim 3, further comprising, using the storage system management application to access the information about the first subset and the information about the second subset, storing the information about the first subset and the information about the second subset in a storage facility the same format, the storage facility being accessible to the storage system management application.

8. A method as recited in claim 7, wherein said format is a non-file-system-specific format.

9. A method as recited in claim 7, wherein said storing comprises storing the information about the first subset and the information about the second subset on a database server.

10. A method as recited in claim 7, wherein said storing comprises storing the information about the first subset in a first table and storing the information about the second subset in a second table.

11. A method as recited in claim 7, wherein said storing comprises storing the information about the first subset and the information about the second subset in a single table.

12. A method as recited in claim 7, wherein said storing comprises storing the information about the first subset and the information about the second subset in a histogram.

13. A method comprising:
    determining a first path comprising a first subset of a directory structure of a storage server;
    determining a second path comprising a second subset of the directory structure of the storage server;
    scanning the first path by using a first agent to collect first information about the first path, wherein the first agent uses a first file system;
    scanning the second path by using a second agent to collect second information about the second path, wherein the second agent uses a second file system different from the first file system, wherein the first agent and the second agent are each configurable to scan a specified configurable portion of the directory structure at a particular level of granularity, and the first path and the second path are determined based on an expected time for the first agent and the second agent to complete the scans;
    generating a first summary and a second summary based on the first and second information; and
    storing the first summary and second summary in a storage facility in the same format.

14. The method of claim 13, wherein the storage server uses a third file system, which is different from at least one of the first and second file systems, to maintain the directory structure.

15. The method of claim 13, wherein said storing comprises storing the first summary and second summary in a table.

16. The method of claim 13, wherein storing comprises storing the first summary and second summary using a histogram.

17. A system comprising:
    a first agent coupled to a network storage system that includes a storage server, to scan a first subset of a structure of data stored in the storage system and to output information about the first subset;
    a second agent coupled to the network storage system, to scan a second subset of the structure of the data stored by the storage system and to output information about the second subset; and
    a storage system management application, physically separate and external to the first agent and the second agent, to access the information about the first subset and the information about the second subset and to generate a human-readable report based thereon,
    wherein the first agent and the second agent are each configurable to scan a specified configurable portion of the structure of data at a particular level of granularity, and the first subset of the structure of data and the second subset of the structure of data are determined based on an expected time for the first agent and the second agent to complete the scan.

18. A system as recited in claim 17, wherein the storage system management application generates a graphical user interface (GUI).

19. A system as recited in claim 17, wherein the first agent uses a first file system and the second agent uses a second file system which is different from the first file system.

20. A system as recited in claim 19, wherein the storage system management application accesses the information about the first subset and the information about the second subset from a storage in which the first subset and the information about the second subset are stored in the same format.

21. A system as recited in claim 17, wherein the first agent uses a first file system; the second agent uses a second file system; and the storage server uses a third file system to maintain the structure of data; and wherein the third file system is different from at least one of the first and second file systems.

22. A system as recited in claim 21, wherein the first file system is network file system (NFS) and the second file system is common Internet file system (CIFS).

23. A system as recited in claim 17, further comprising a database server to store the information about the first subset and the information about the second subset in a single non-file-system-specific format.

24. A system as recited in claim 17, wherein the structure of data is a hierarchical structure of data.

25. A system as recited in claim 24, wherein the structure of data is a directory structure of a data volume.

* * * * *